United States Patent [19]

Jean-Luc

[11] Patent Number: 4,930,800
[45] Date of Patent: Jun. 5, 1990

[54] SHORT COUPLING WITH VARIABLE GEOMETRY FOR TRAILERS

[75] Inventor: Andre Jean-Luc, Dangolsheim, France

[73] Assignee: Lohr Industrie, Hangenbieten, France

[21] Appl. No.: 191,102

[22] Filed: May 6, 1988

[30] Foreign Application Priority Data

May 6, 1987 [FR] France ................................ 8706536

[51] Int. Cl.⁵ .............................................. B60D 1/02
[52] U.S. Cl. .............................. 280/446.1; 280/476.1; 280/478.1
[58] Field of Search ............... 280/476.1, 478.1, 479.1, 280/446.1, 404

[56] References Cited

U.S. PATENT DOCUMENTS

| | | | |
|---|---|---|---|
| 2,400,522 | 5/1946 | Lantz | 280/446.1 |
| 2,524,312 | 10/1950 | Garnett | 280/446.1 |
| 2,640,710 | 6/1953 | Duffy | 280/446.1 |
| 2,701,145 | 2/1955 | Kunz | 280/446.1 |
| 3,727,945 | 4/1973 | Parker | 280/446.1 |
| 3,740,076 | 6/1973 | Cupp | 280/476.1 |
| 4,117,906 | 10/1978 | Mustered | 280/404 |
| 4,611,821 | 9/1986 | Jeanson et al. | 280/476.1 |

Primary Examiner—Charles A. Marmor
Assistant Examiner—Eric Culbreth
Attorney, Agent, or Firm—Schwartz & Weinrieb

[57] ABSTRACT

A short coupling with variable geometry for trailers. A coupling which is characterized by the fact that a means of connection with elastic memory is connected in a position of minimum spacing between the trailer (2, 7) and the truck (1), with two symmetrical supports for abutting and pivoting the front face of the trailer relative to the rear face of the truck at the level of each corner, around a vertical axis (29) located as close as possible to each corner, to obtain a trajectory which clears the entire front face of the trailer when it is pivoted while turning a corner. This invention is of interest to manufacturers of transport vehicles.

7 Claims, 11 Drawing Sheets

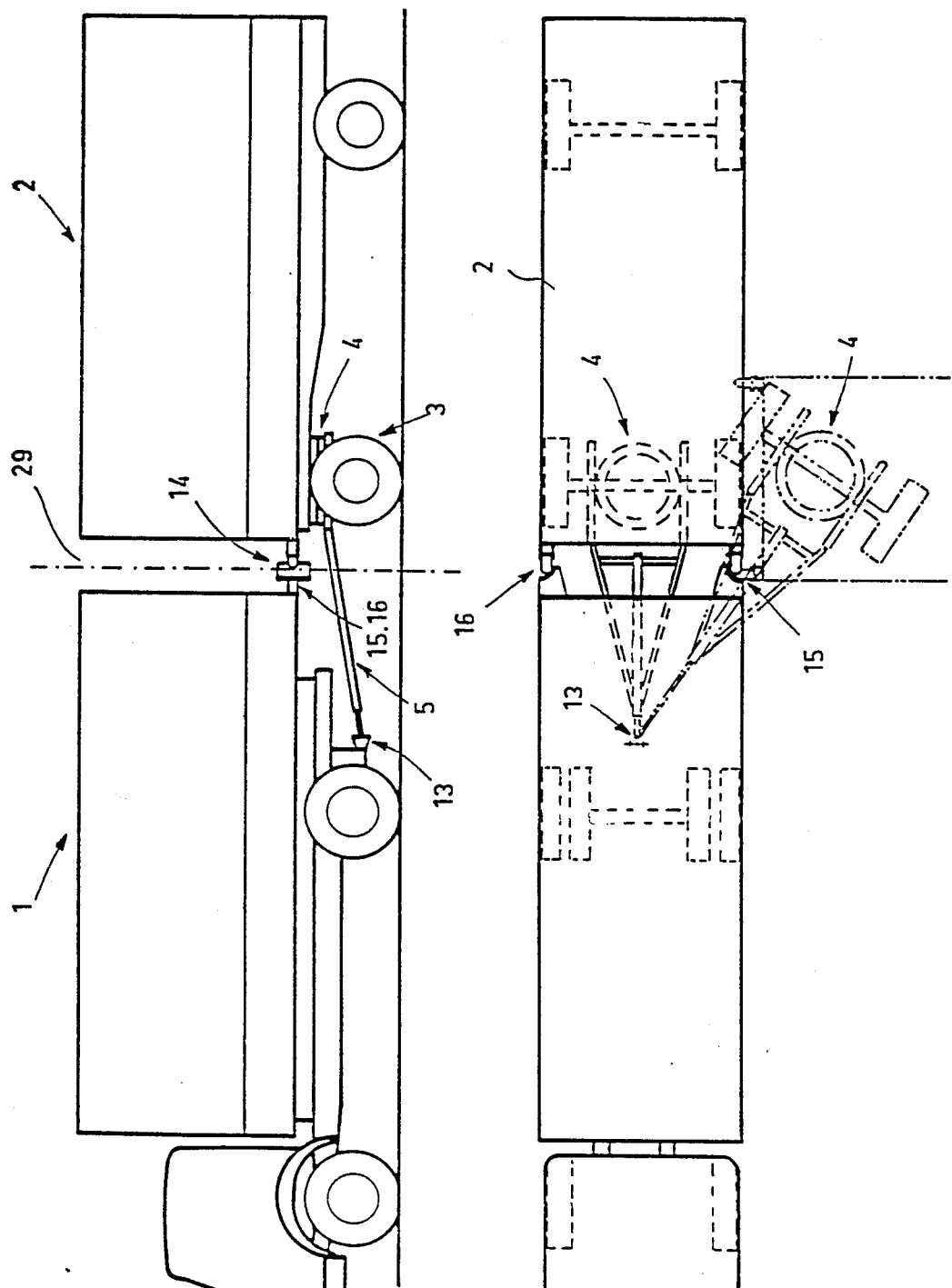

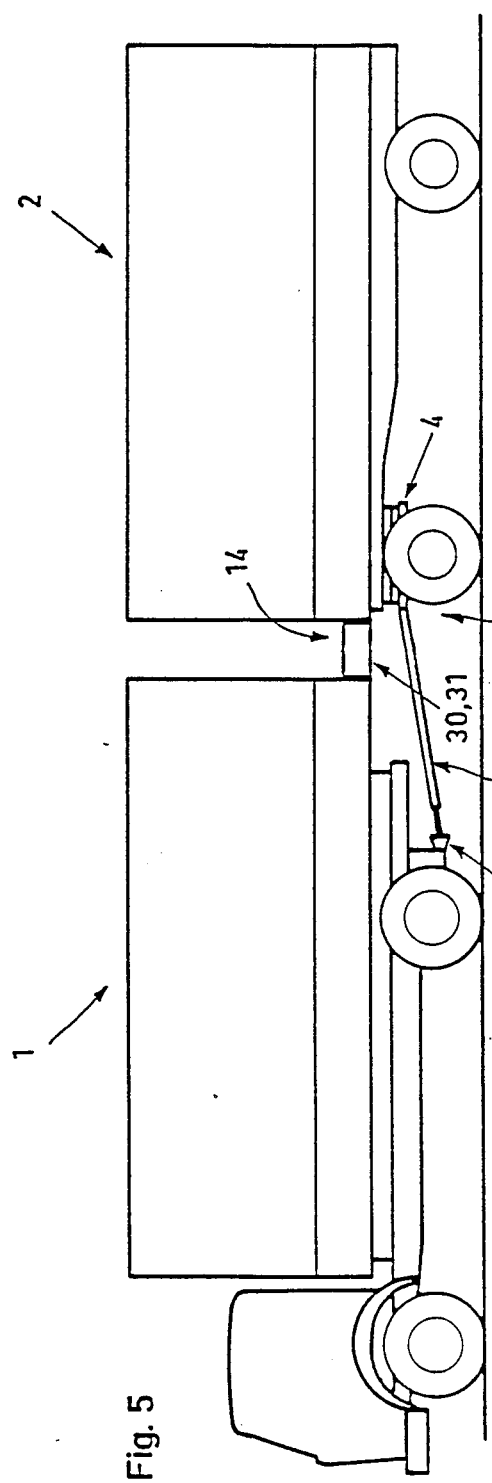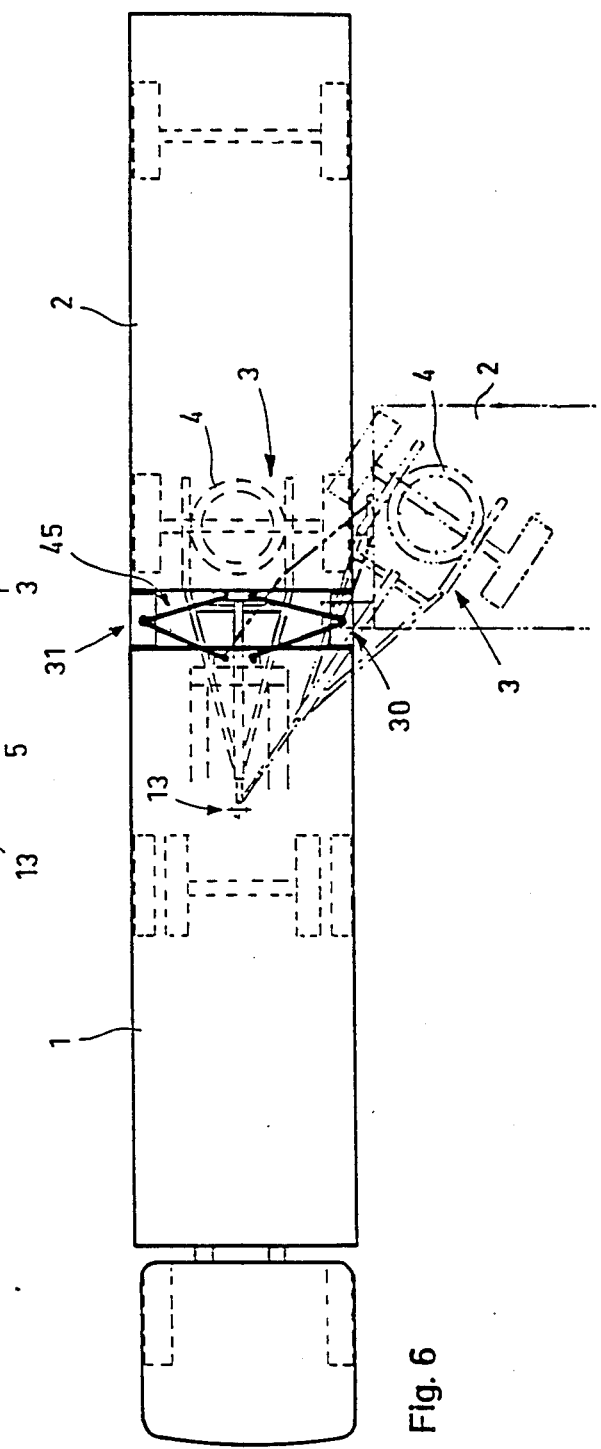
Fig. 5
Fig. 6

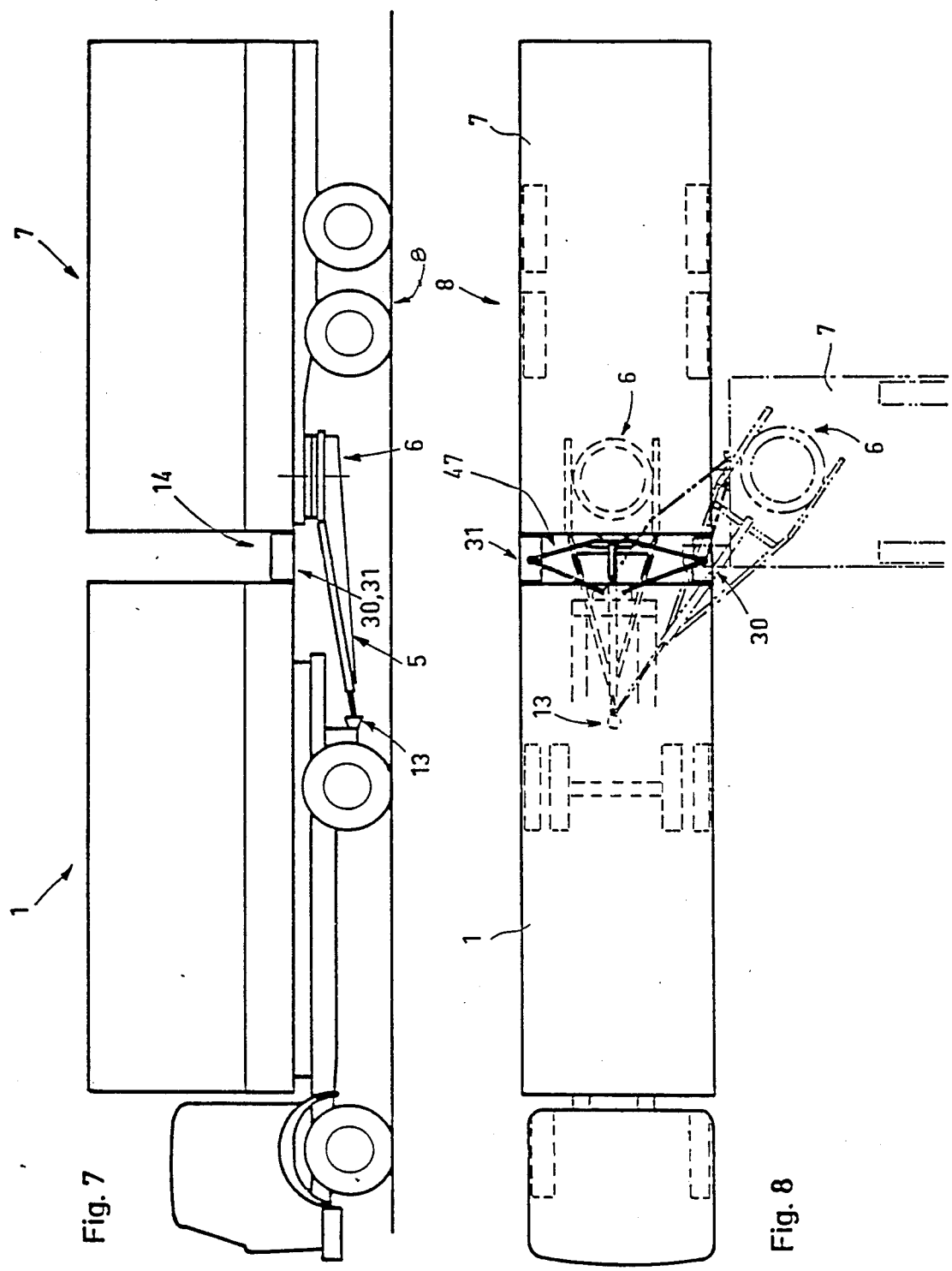

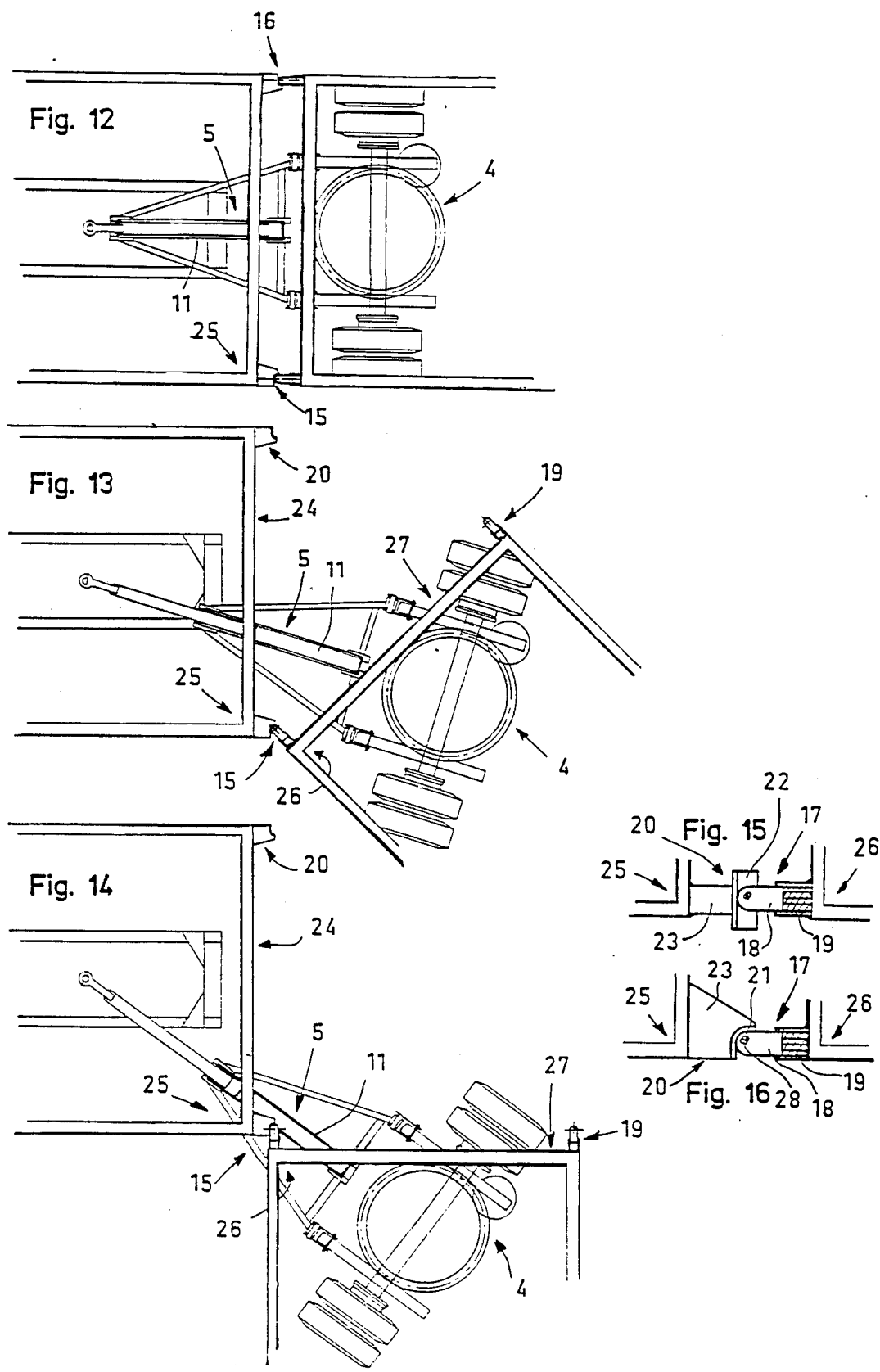

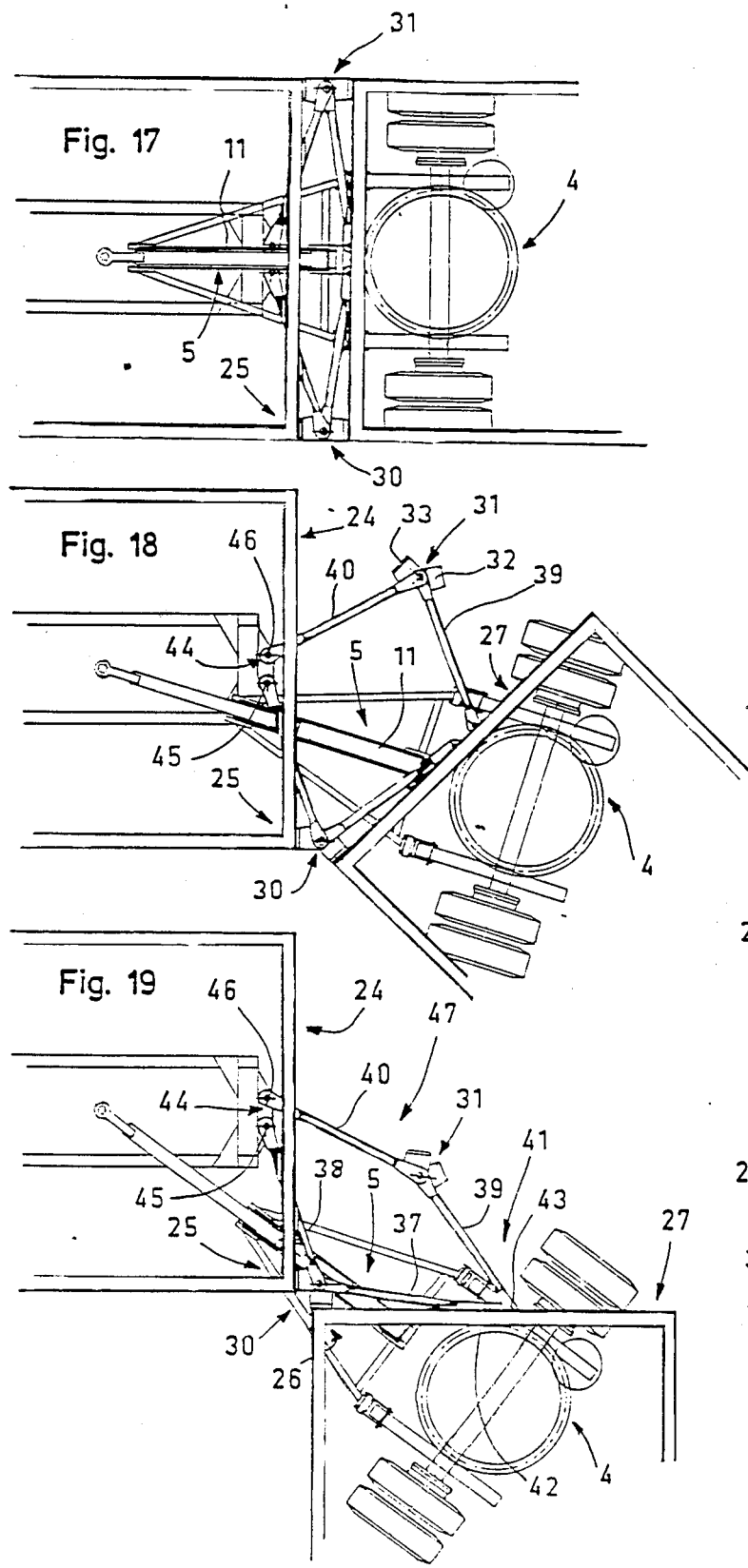

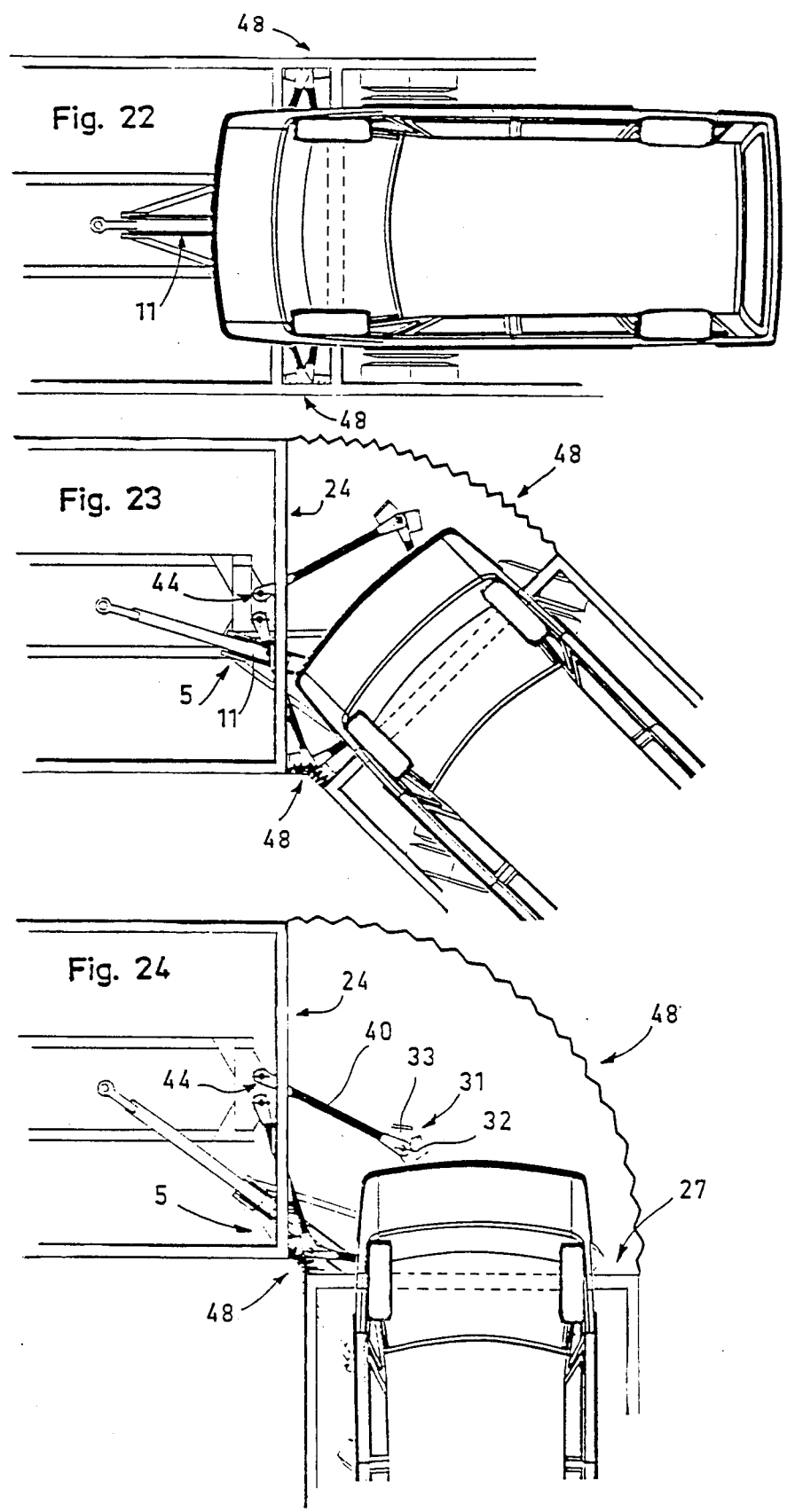

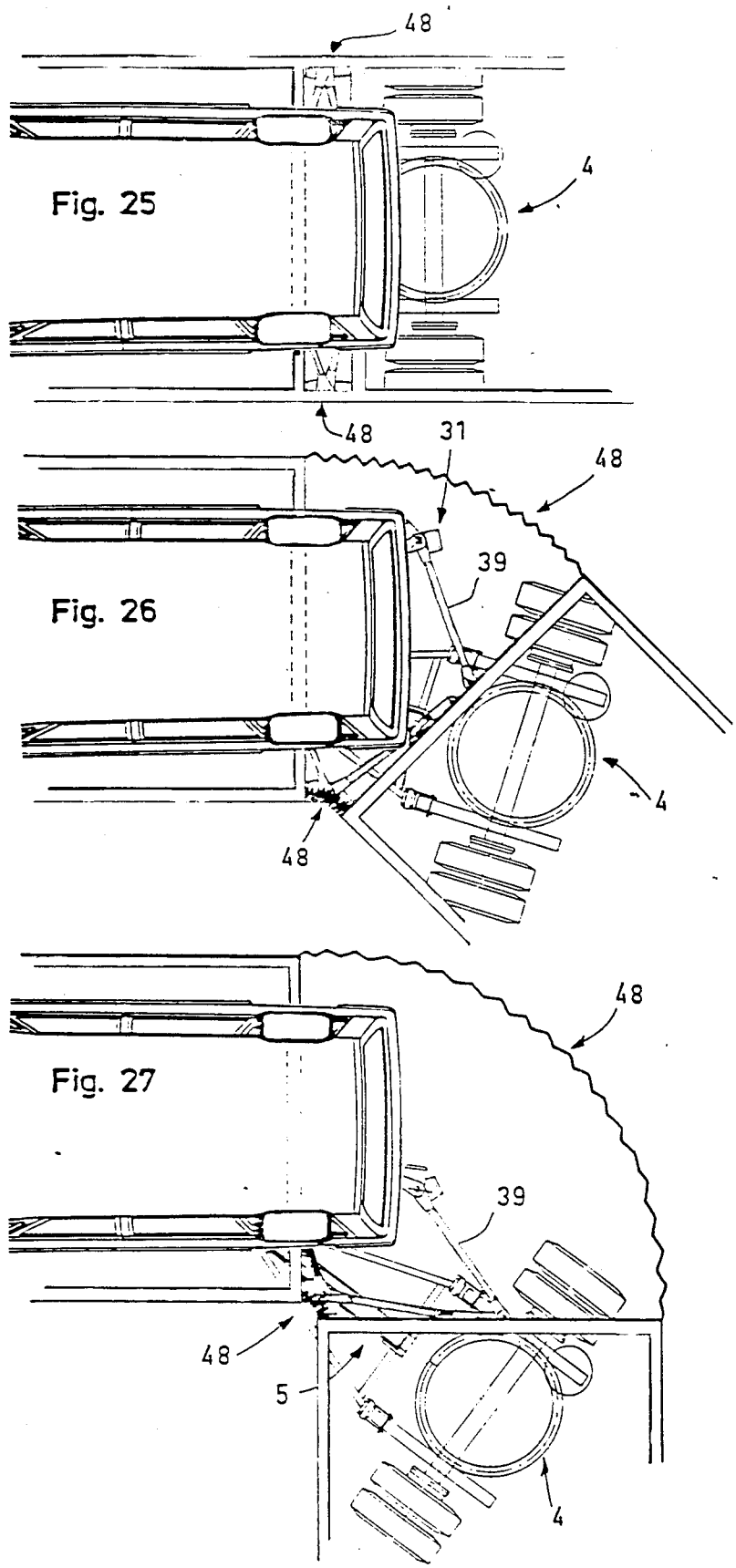

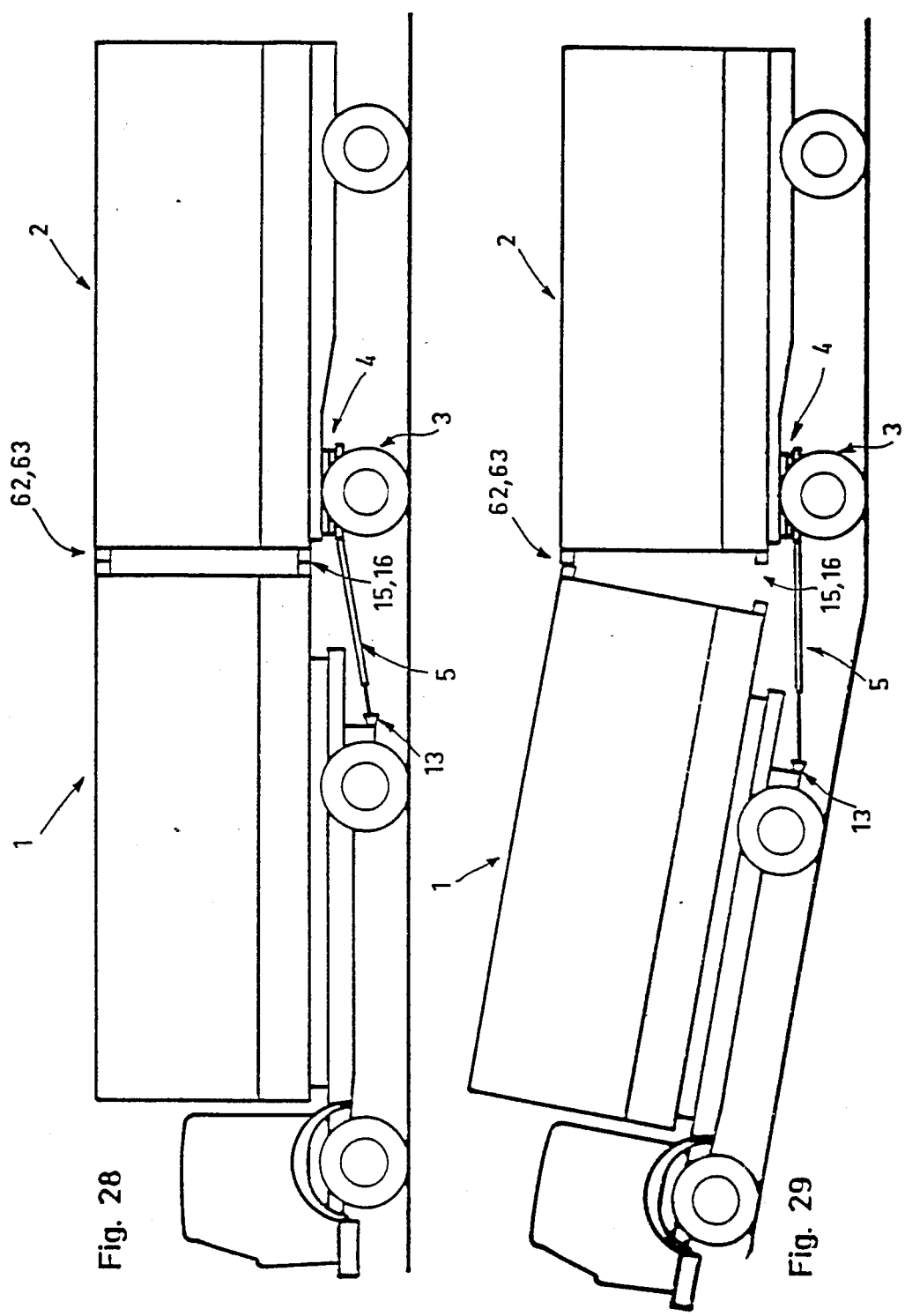

SHORT COUPLING WITH VARIABLE GEOMETRY FOR TRAILERS

The present invention relates to a short coupling with variable geometry for trailers, particularly those of the front flange towing type or the front shaft guide type and those of the center shaft type.

The technical sector at which the invention is aimed is that of transport vehicles and, in particular, vehicles composed of a tractor trailer or truck attached to a trailer.

The short coupling with a variable geometry according to the invention particularly relates to a tandem transport vehicle, connected to its trailer by a coupling with a minimum length, which varies as a function of the turning radius, in such a way as to remain within the legal limits for the length of a transport convoy in a direct line.

Since the length limits of a transport convoy are imposed by motor vehicle regulations, the length of the coupling has to be shortened in order to obtain greater loading capacity.

However, for safety reasons, the length of the articulated connection is itself limited by the minimum possible distance between the rear part of the truck and the front face of the trailer. In fact, the distance between the truck and its trailer must be sufficient to prevent contact between the two opposing parts, both during a turn, where the corner edges of the trailer run the risk of bumping into the rear face of the truck, and when traveling over bumps and dips in the road, where the same risk is present for the horizontal edge of the trailer, whether it is lower or higher.

Various design engineers, in order to increase the loading capacity of their transport convoys, have come up with diverse technical solutions which make it possible to make the length of the coupling variable, from a retracted position in a straight line, which allows fulfillment of the legal requirements, to an extended position when turning or maneuvering, to assure free angular clearance of the trailer, even in very pronounced curves.

It is understood that in the retracted position, the aim is a minimum distance between the trailer and the rear face of the truck body, in such a way as to obtain the greatest possible loading capacity.

This increased loading capacity is even more significant if it allows an entire additional pallet.

Among the various solutions proposed by design engineers, the following patents can be cited. European patent No. 31 596, registered by the Emil DOLL company, European patent No. 33 873, registered by the MEIER company, European patent Nos. 66 269 and 168 521, registered by the KASSBOHRER company, European patent Nos. 111 760 registered by OR-THAUS and No. 122 527 registered by KRONE, Swiss patent No. 570 294 VETTER and French patent No. 2 544 258 FREJAT.

These earlier solutions involve mechanical rods in the form of a sliding guide mechanism for the steering mechanism in a longitudinal direction, and mechanical means related to it, to move the rod to the rear during curves.

These adjustment means have proven to be delicate and sensitive to shocks. They must therefore be protected.

Furthermore, they are difficult to construct and they promote swaying on downward inclines.

Furthermore, there are extendible rods, called active control rods, which are currently commercially available.

According to these units, the rod is extended by a pneumatic device controlled by a proximity detector, with or without contact. When the trailer comes within a minimum distance, this is detected, and the detector activates a pneumatic device which exerts an extension thrust, in such a way as to avoid contact between the rear of the truck and the trailer. The energy necessary for the extension displacement of the rod is taken from the truck spring or provided by an independent auxiliary group.

This type of solution requires a complex and difficult construction. Furthermore, it is limited by the geometry of the system and by the reaction speed of the hydraulic unit.

Other disadvantages of these systems involve weight and the space required.

The present invention has as its purpose to eliminate these disadvantages by proposing a short coupling with variable geometry, which is particularly simple and performs well. To this end, it refers to a short coupling with variable geometry for trailers, particularly those of the front flange towing type or the center shaft type, comprising an extendible rod, with a length which varies with the turning angle, characterized by the fact that a means of connection with elastic memory is connected in a position of minimum spacing between the trailer and the truck, with two symmetrical supports for abutting and pivoting the front face of the trailer relative to the rear face of the truck at the level of each corner, around a vertical axis located as close as possible to each corner, to obtain a trajectory which clears the entire front face of the trailer when it is pivoted while turning a corner.

As indicated, the coupling according to the invention is greatly superior and offers numerous advantages:

major space gain both for bulk loading and pallet loading;

complete safety in straight-line movement and in turns;

better stability in turns;

the hitch at the back of the truck continues to be the universal type, allowing the truck to pull any type of trailer. Furthermore, in the front guide version, the trailer can be used with any type of truck, by using the rod in its maximum extension position;

the turning trajectory of the trailer corner clears the truck, because the turn is as short as possible, thanks to the elastic memory. Therefore, the front of the trailer will not contact the rear of the truck at any time. Due to this fact, the rotational displacement of the overhang end of the load area when taking a turn makes it possible to extend the load of the trailer beyond the separation space, which is a particularly important advantage in the case of car carriers;

the possibility of adapting a deformable connection, for example the bellows type, which makes it possible to assure a sealed state and to eliminate communication doors and to reduce turbulence;

the articulation-abutment pieces assure that a minimum distance is maintained in a straight line and that the corner clears according to the shortest trajectory;

absolute safety, because failure of a jack is simply translated into an extension of the rod;

the invention makes it possible to obtain the ideal turning trajectory, by choosing the optimum values of the towing front flange position and the coupling hook.

The invention will be easily understood by reading the following description, which is given a non-limiting example of an embodiment, with reference to the attached figures, where:

FIGS. 1 and 2 are side and top views, respectively, of a convoy of the truck and trailer type with a front towing flange, equipped with a coupling according to the invention, comprised of an extendible rod and two dissociable pieces for abutment and articulation;

FIGS. 5 and 6 are side and top views, respectively, of a convoy of the truck and trailer type with a front towing flange, where the articulated connection is made by the coupling according to the invention, comprised of an extendible rod and two dissociable pieces for abutment and articulation, held by a set of articulated connecting rods;

FIGS. 7 and 8 are side and top views, respectively, of a convoy of the truck and trailer type with a center shaft, where the articulated connection is made by the coupling according to the invention, comprised of an extendible rod and two dissociable pieces for abutment and articulation, held by a set of articulated connecting rods;

FIGS. 12, 13 and 14 are schematic top views in the two extreme positions, straight line and perpendicular, and in an intermediate turning position in the case where there are two dissociable pieces for articulation and abutment;

FIGS. 15 and 16 are detail side and top views, respectively, of an embodiment of a dissociable piece for articulation and abutment;

FIGS. 17, 18 and 19 are schematic top views in the two extreme positions, straight line and perpendicular, and in an intermediate turning position of the case where there are two dissociable pieces for articulation and abutment connected by a set of articulated connecting rods;

FIGS. 20 and 21 are detail side and top views, respectively, of an embodiment of a piece for articulation and abutment;

FIGS. 22, 23 and 24 are top schematic views showing a first example of use according to three configurations of position with an overhang load, in this case a car, projecting beyond the front of, the trailer;

FIGS. 25, 26 and 27 are top schematic views showing a second example of use according to three configurations of position with an overhang load, in this case a car, projecting beyond the rear of the truck;

FIGS. 28 and 29 are side views of a transport convoy on a level surface and in a dip, respectively, with a variation with additional pieces for articulation and abutment at the top part.

Figures 3, 4:
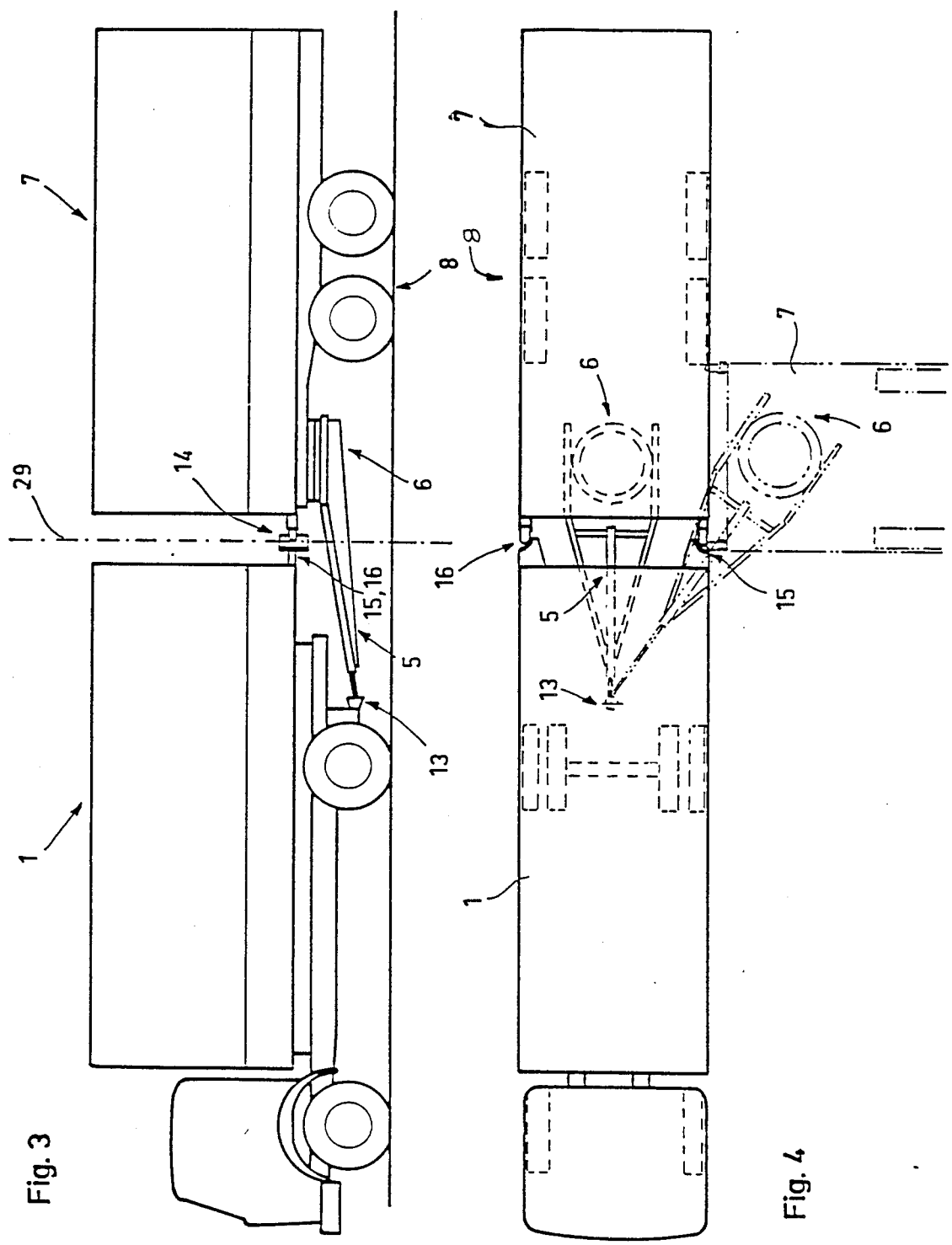
FIGS. 3 and 4 are side and top views, respectively, of a convoy of the truck and trailer type with a center shaft, equipped with a coupling according to the invention, comprised of an extendible rod and two dissociable pieces for abutment and articulation.

The invention will be described using the examples below, by its general means, and then by its specific means, where several variations apply to a trailer with a front towing flange, then to a semi-supported trailer, for example with a center shaft.

The general idea of the invention consists of using an extendible rod constrained in a minimum distance position of the trailer with regard to the truck, by a permanent elastic memory, combined with double means for bracing and support and maintenance of the distance within a narrow zone of proximity contact, or on the vertical edges with regard to the truck and the trailer, and for pivoting around a parallel axis to the said vertical edges. The minimum distance is achieved by the pieces for articulation and abutment.

The rod is preferably but not exclusively extendible by the same means which assures the force of the elastic memory. This can come, for example, from a metal spring or from one or more links with a memory effect.

The elastic memory assures that a constant minimum distance is maintained, determined by the means of bracing and abutment and by the rotation performed by the support bracket around an axis parallel to the corresponding edge of the corner of the rear of the truck as close as possible to this edge, to obtain a clearance trajectory of the opposite corner of the trailer when pivoting during a turn.

The general idea explained above is implemented by the following general means, which can be modified in an evident or minor manner, or replaced by any equivalent means, whether closely related or derived.

A trailer truck 1 pulls a trailer 2 with a front guide hitch 3 installed on a front towing flange 4 which forms a unit with an extendible rod 5 which can make longitudinal movements to bring the trailer closer or farther away from the truck, or on a pivoting rim 6 in the case of a trailer 7 with a center shaft 8. This rim 6 is a perfect equivalent of the front towing flange 4, as far as the invention is concerned.

The rod is of the conventional type, where the central element 9 is composed of a telescopic assembly 10 activated by a traction jack 11.

The central element 9 ends with a ring piece 12 or an equivalent, which is affixed to a conventional coupling hook 13 or its equivalent.

As indicated above, the jack 11 can be dissociated from the central element 9 of the rod.

According to another variation, two distinct means which operate in parallel, one for extension and retraction of the jack, the other for the permanent elastic memory in the position of minimum spacing, can be provided.

The single or double means of extension and/or permanent elastic memory in a position of minimum spacing below is and/or are associated with a double assembly 14 of symmetrical articulation-abutment pieces, which may or may not be independently connected with the front of the trailer and the rear of the truck by an articulated connection, for example by symmetrical articulated arms.

These articulation-abutment pieces simultaneously fulfill the function of providing the articulation point or center and of maintaining the minimum distance.

It should be noted here that in spite of the constraints caused by the rotation around corners by the articulation-abutment pieces, it remains possible, by choosing optimum position values for the front towing flange and for the coupling hook, to obtain an ideal turning trajectory.

The articulation-abutment pieces are implemented in different technical forms. First of all, we distinguish between the plug-type pieces 15 and 16 used in FIGS. 1, 2, 3 and 4 and shown in detail schematically in FIGS. 15 and 16. They are particularly a projecting male buffer piece 17 with a rounded end 18, for example semispherical, mounted to move in a cushioning block 19 which is part of the trailer, and a female piece 20 which is part of the rear face of the truck, with a receiving plate 21 in the form of a vertical concave stump 22 with a sufficient height to allow vertical engagement corresponding to variations in height of the end 18 due to changes in level and jolts related to driving on the dips and bumps of common irregularities of the road.

The concave plate 22 is attached to a horizontal connection plate 23 which connects at the lower part with the rear face 24 of the truck at the level of and close to its adjacent vertical edge 25. The male buffer piece 17 is also attached corresponding to the level or to the adjacent vertical edge 26 of the front face 27 of the trailer 2 or 7.

In this way, a center of rotation 28 has been created on both sides, which can be vertically displaced along the length of the plate 22 around a pivoting axis 29 parallel to the corresponding edge of the truck or of the trailer in a vertical position on a level road.

Various analogous forms of plugs can be used within the scope of the present invention. The principle of these variations is to arrange the two dissociable pieces so that the abutment function is achieved simultaneously with maintaining a minimum space and a pivoting center for each side of the convoy.

Another variation shown in FIGS. 5 to 8 uses pivoting articulation-abutment pieces 30 and 31 shown in detail in FIGS. 20 and 21. These pieces are each composed of two shoes 32 and 33, articulated relative to one another by a pivoting axle 34 which passes through a frame and a bolt belonging to each shoe, acting as the center of rotation, equivalent to the center 28 which can be displaced around the axis 29.

Each shoe is equipped with a sole 35 and 36 of an absorbent material to cushion shocks, and is attached as part of the ends of articulated arms 37 and 38 which are also crossed by the pivoting axle 34 assuring the connection between the body of the truck and that of the trailer. Articulated arms, for example identical ones, 39 and 40 connect the homologous articulation-abutment piece 31 to the body of the trailer and that of the truck, respectively.

The ends of the arms 37 and 39 are articulated, for example on a plate 41 on the trailer, at two distinct articulation points 42 and 43.

The same is true for the ends of the arms 38 and 40 which are articulated on a plate 44 on the truck, at two articulation points 45 and 46.

The arms articulated in this way comprise a deformable assembly 47 which makes it possible to assure the position of the center of rotation 28.

To this end, it is important to observe that the arms 38 or 40 and 37 or 39 which are involved, at the center of rotation, do not move relative to the truck or to the trailer during the entire rotation, thereby making it possible to keep the center of rotation 28 in place and to support the lateral component of the memory force. This is clearly evident in FIGS. 18 and 19.

It is understood that different variations can be envisaged for these articulations.

They can be mixed, implemented in the shape of a patella or any other analogous or equivalent shape which fulfills the same general functions. Thanks to the permanent memory of the minimum distance position, the contact of the shoes with the adjacent faces of the rear of the truck and the front of the trailer is assured during the entire turning rotation, to guarantee a clearance trajectory of the front face of the trailer while turning.

Figure 9:
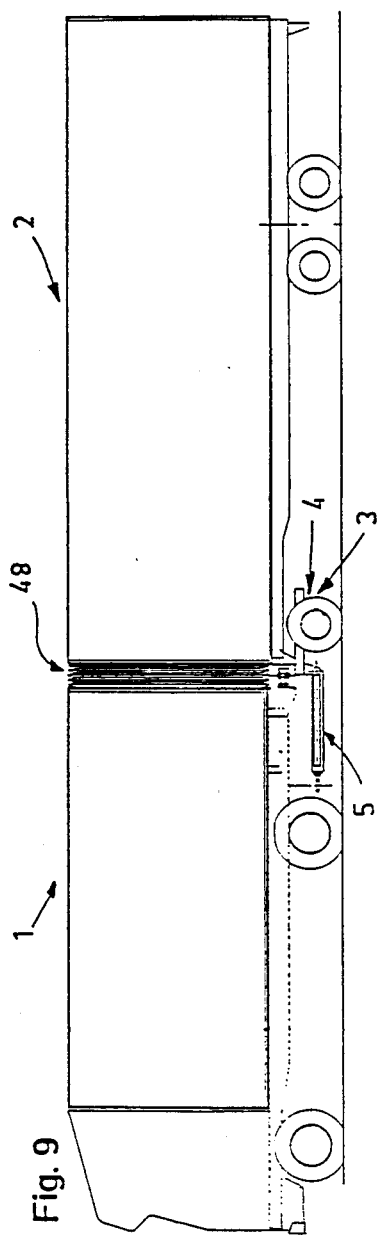
FIG. 9 is a side view of a bellows variation with a set of articulated connecting rods.
Figure 10:
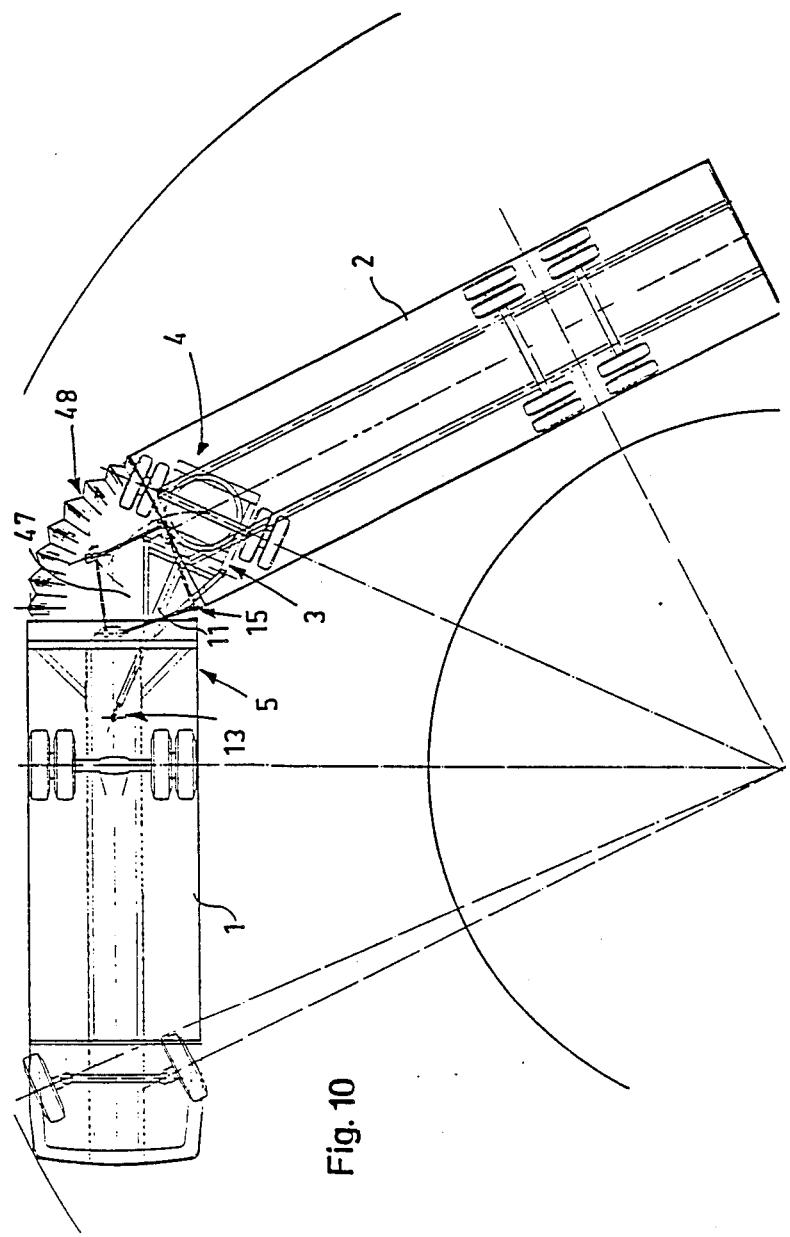
FIG. 10 is a top view of the same variation in the turning configuration.
Figure 11:
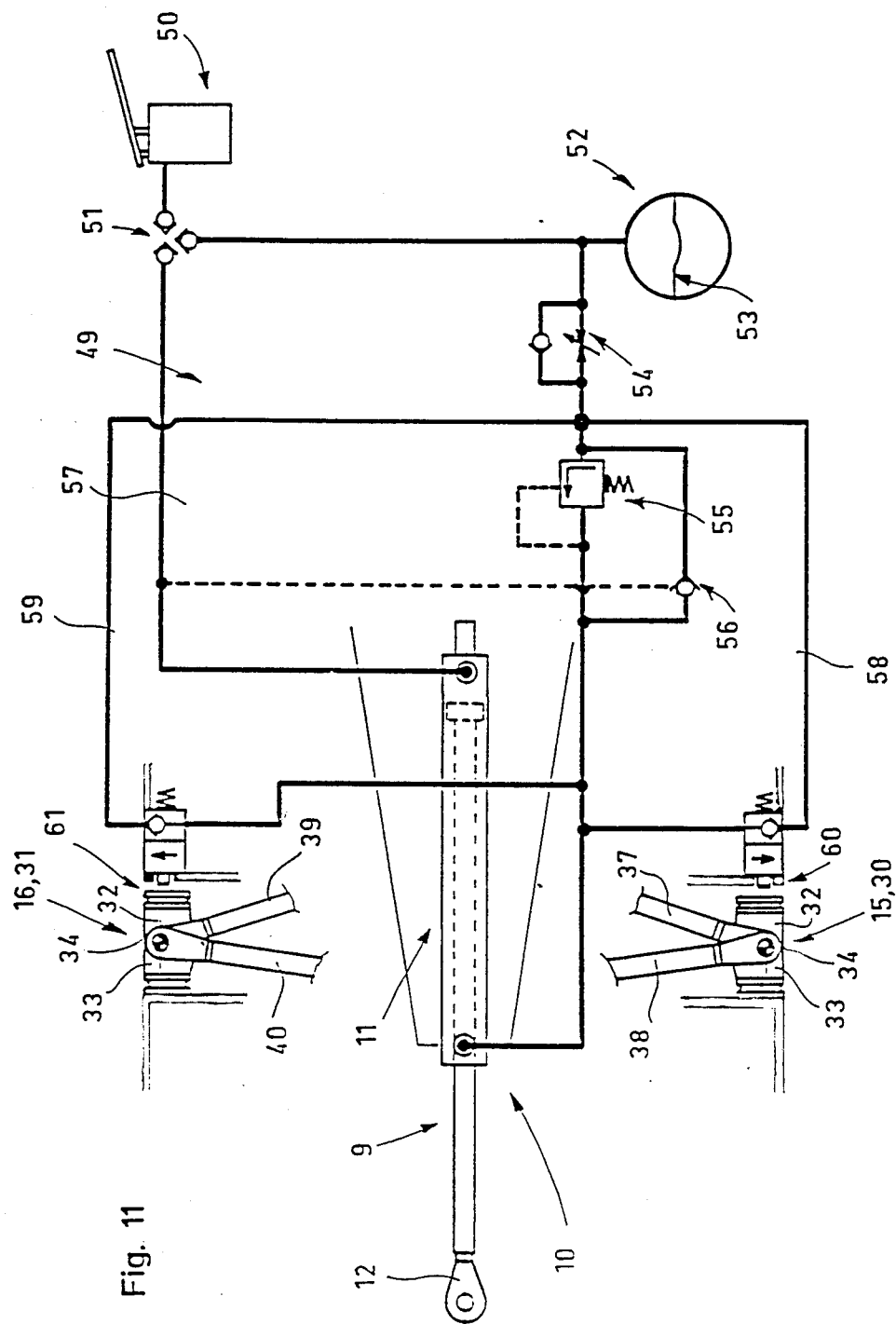
FIG. 11 is a hydraulics schematic of the control circuit for the extension jack of the rod, showing the contact detectors.

The trajectory with the shortest radius of curvature of the end of the trailer makes it possible to protect the gap between the truck and the trailer in the form of a bellows 48 or its equivalent, as shown in FIGS. 9 and 10.

We will now examine the hydraulic control of the jack and the different safety systems provided in case of failure of this jack, or in case of an abnormal configuration of the truck and the trailer.

This is a closed hydraulic circuit 49, in which the hydraulic fluid is injected under pressure by a manual pump 50 or its equivalent, through a hydraulic coupler 51, towards an oleo-pneumatic storage cell 52 with a membrane 53 or a piston.

The principal circuit is comprised of the jack 11, for example a double-action jack, a throttle 54 which has the purpose of controlling the flow of fluid towards the chamber on the shaft side of the jack 11, the throttle shunted by an anti-return valve, a pressure stop-valve 55, the escape of which is set to a safety level for pressure, for example 250 bars. The stop-valve 55 is shunted by a pilot valve 56 from the conduit 57 which feeds the chamber of the jack on the rod extension side.

Two circuits 58 and 59 comprising abutment contact detectors 60 and 61 are installed in parallel on the pressure stop-valve 55. This is an end-of-course hydraulic system with slide valves or analogous pieces closing the circuit at rest.

If the contact with the trailer is not assured simultaneously on the two articulation-abutment pieces as shown, they allow the fluid to be forced through the pressure stop-valve 55 and therefore assure maximum resistance to extension by the jack, up to the pre-set maximum value, from which point the stop-valve opens and allows direct return to the storage cell.

In this way, maximum resistance to extension is established.

The manual pump also allows manual control of the jack to break the connection manually, before proceeding to open the doors or other access between the trailer and the truck.

For safety reasons, the number of articulation-abutment pieces can be double, with or without a connection by articulated connecting pieces. Thus, the additional articulation-abutment pieces 62 and 63 at the top make it possible to prevent contact between the upper corners of the truck and the trailer when they pass over pronounced dips, as shown in FIGS. 28 and 29, and by this fact, to allow an additional reduction of the minimum distance by clearance at the bottom or at the top, or in dips.

Operation proves to be simple. In a straight line, the traction jack 11, by the memory force which it develops, holds the trailer against the rear face of the truck by way of the articulation-abutment pieces.

When going into a curve, the permanent memory force forces the trailer against the adjacent corner of the truck, by way of the corresponding articulation-abutment piece, corresponding to the level of which the rotation is made as short as possible.

By making the end of the loading area describe a trajectory with the smallest possible radius of curvature, it is possible to carry loads on overhang extensions towards the front of the trailer, which can overlap the rear of the truck without problems after a turn has been made (FIGS. 22 to 24).

The same is true for loads which overhang beyond the rear of the truck (FIGS. 25 to 27).

This advantage proves to be important in the case of car carriers, for which an additional car can be included within the maximum authorized length.

Various modifications are possible within the scope of the present invention, not only those in the area of equivalents, but also direct, simple or obvious variations.

I claim:

1. A coupling system defined between a truck vehicle and a trailer vehicle, comprising:
    extensible rod means pivotably mounted upon said truck and trailer vehicles at opposite ends thereof and extensible between two relatively different lengths, a first length of which is defined by means of said truck and trailer vehicles when said truck and trailer vehicles are travelling in alignment with respect to each other under normal running conditions, and a second length of which is defined by means of said truck and trailer vehicles when said truck and trailer vehicles are disposed out of axial alignment with respect to each other under turning conditions; and
    engageable/disengageable support means provided at laterally spaced corner regions of a rear surface portion of said truck vehicle and at laterally spaced corner regions of a front surface portion of said trailer vehicle for permitting said truck and trailer vehicles to engage each other by said support means and thereby define a predetermined distance between said truck and trailer vehicles when said truck and trailer vehicles are operating under said aligned normal running conditions, and for permitting said truck and trailer vehicles to disengage each other upon one side of said vehicles and for remaining engaged with each other upon the opposite side of said vehicles so as to define a vertically-extending corner-turning fulcrum axis, at said corner region of said opposite side of said vehicles, about which said truck and trailer vehicles pivot relative to each other under said turning conditions.

2. A system as set forth in claim 1, wherein:
    said extensible rod means comprises a hydraulic jack.

3. A system as set forth in claim 1, wherein:
    said engageable/disengageable support means comprises a concave-configured female bracket secured to each one of said corner regions of said truck vehicle, and a rounded-end male buffer member secured to each one of said corner regions of said trailer vehicle.

4. A system as set forth in claim 1, wherein said engageable/disengageable support means comprises:
    a pair of articulated arms pivotably connected at one end thereof to said truck vehicle;
    a pair of articulated arms pivotably connected at one end thereof to said trailer vehicle; and
    a pair of shoes, pivotably connected to second opposite ends of said truck vehicle articulated arms and said trailer vehicle articulated arms so as to interconnect respective pairs of said articulated arms of said truck and trailer vehicles.

5. A system as set forth in claim 4, wherein:
    said one ends of said articulated arms of said truck and trailer vehicles are connected to said truck and trailer vehicles at predetermined locations disposed intermediate said corner regions of said truck and trailer vehicles.

6. A system as set forth in claim 4, wherein:
    said extensible rod means comprises a hydraulic jack.

7. A system as set forth in claim 6, further comprising:
    contact sensor means operatively associated with said pair of shoes for determining said predetermined distance between said truck and trailer vehicles and for controlling hydraulic operation of said hydraulic jack.

* * * * *